United States Patent
Ikeuchi et al.

(10) Patent No.: US 10,840,499 B2
(45) Date of Patent: Nov. 17, 2020

(54) POSITIVE ELECTRODE ACTIVE MATERIAL AND BATTERY USING POSITIVE ELECTRODE ACTIVE MATERIAL

(71) Applicant: Panasonic Intellectual Property Management Co., Ltd., Osaka (JP)

(72) Inventors: Issei Ikeuchi, Hyogo (JP); Ryuichi Natsui, Osaka (JP); Kensuke Nakura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 123 days.

(21) Appl. No.: 15/702,632

(22) Filed: Sep. 12, 2017

(65) Prior Publication Data
US 2018/0138496 A1   May 17, 2018

(30) Foreign Application Priority Data
Nov. 15, 2016   (JP) .................................. 2016-222125

(51) Int. Cl.
*H01M 4/131* (2010.01)
*C01G 45/12* (2006.01)
(Continued)

(52) U.S. Cl.
CPC ............ *H01M 4/131* (2013.01); *C01D 15/00* (2013.01); *C01G 1/02* (2013.01); *C01G 45/1228* (2013.01);
(Continued)

(58) Field of Classification Search
CPC . H01M 4/02–0497; H01M 4/13–1399; H01M 10/00–60
(Continued)

(56) References Cited

U.S. PATENT DOCUMENTS

| 6,037,095 A | 3/2000 | Miyasaka |
| 6,416,902 B1 | 7/2002 | Miyasaka |

(Continued)

FOREIGN PATENT DOCUMENTS

| CN | 103928672 A | 7/2014 |
| EP | 2921455 A1 | 9/2015 |

(Continued)

OTHER PUBLICATIONS

ICSD Details on Search Result for Li2 (Mn O3), printed on Feb. 4, 2020.
(Continued)

*Primary Examiner* — Bach T Dinh
(74) *Attorney, Agent, or Firm* — McDermott Will & Emery LLP

(57) ABSTRACT

A positive electrode active material comprising: a compound which has a crystal structure belonging to space group Fm-3m and which is represented by the following composition formula: $Li_xMe_yO_\alpha X_\beta$. In the formula, the Me represents one or more elements selected from the group consisting of Mn, Ni, Co, Fe, Al, Sn, Cu, Nb, Mo, Bi, Ti, V, Cr, Y, Zr, Zn, Na, K, Ca, Mg, Pt, Au, Ag, Ru, Ta, W, La, Ce, Pr, Sm, Eu, Dy, and Er. The X represents one element selected from the group consisting of Cl, Br, I, N, and S. The following conditions are satisfied: $0.5 \leq x \leq 1.5$; $0.5 \leq y \leq 1.0$; $1 \leq \alpha < 2$; and $0 < \beta \leq 1$.

13 Claims, 1 Drawing Sheet

(51) Int. Cl.

| | | |
|---|---|---|
| C01G 51/00 | (2006.01) | |
| C01D 15/00 | (2006.01) | |
| C01G 1/02 | (2006.01) | |
| H01M 4/485 | (2010.01) | |
| H01M 4/505 | (2010.01) | |
| H01M 4/525 | (2010.01) | |
| H01M 10/0525 | (2010.01) | |
| H01M 4/02 | (2006.01) | |

(52) U.S. Cl.
CPC ............. *C01G 51/42* (2013.01); *C01G 51/50* (2013.01); *H01M 4/485* (2013.01); *H01M 4/505* (2013.01); *H01M 4/525* (2013.01); *C01P 2002/54* (2013.01); *C01P 2002/72* (2013.01); *C01P 2002/76* (2013.01); *H01M 10/0525* (2013.01); *H01M 2004/028* (2013.01)

(58) Field of Classification Search
USPC .......................................... 429/1–11, 65–255
See application file for complete search history.

(56) References Cited

U.S. PATENT DOCUMENTS

| | | | |
|---|---|---|---|
| 6,872,491 | B2 | 3/2005 | Kanai et al. |
| 7,429,434 | B2 | 9/2008 | Mihara et al. |
| 8,741,484 | B2 | 6/2014 | Karthikeyan et al. |
| 9,178,249 | B2 | 11/2015 | Amine et al. |
| 2002/0022183 | A1 | 2/2002 | Ogawa et al. |
| 2002/0055042 | A1 | 5/2002 | Kweon et al. |
| 2004/0202938 | A1 | 10/2004 | Noguchi et al. |
| 2004/0229123 | A1 | 11/2004 | Takahashi et al. |
| 2005/0084757 | A1 | 4/2005 | Kweon et al. |
| 2009/0136854 | A1 | 5/2009 | Nakura |
| 2009/0202892 | A1 | 8/2009 | Inagaki et al. |
| 2010/0086854 | A1 | 4/2010 | Kumar et al. |
| 2011/0247321 | A1 | 10/2011 | Streeter et al. |
| 2011/0294019 | A1 | 12/2011 | Amine et al. |
| 2013/0136987 | A1 | 5/2013 | Uehara et al. |
| 2013/0209871 | A1 | 8/2013 | Kato et al. |
| 2013/0266868 | A1 | 10/2013 | Sun et al. |
| 2014/0099549 | A1* | 4/2014 | Ceder .................. H01M 4/485 429/220 |
| 2014/0127583 | A1* | 5/2014 | Han ..................... H01M 4/505 429/223 |
| 2014/0162127 | A1 | 6/2014 | Kim et al. |
| 2014/0205913 | A1 | 7/2014 | Park et al. |
| 2014/0272607 | A1 | 9/2014 | Amine et al. |
| 2015/0010819 | A1 | 1/2015 | Lee et al. |
| 2015/0090924 | A1* | 4/2015 | Lee ....................... H01M 4/505 252/182.1 |
| 2015/0093646 | A1* | 4/2015 | Kawada ................. C01B 11/20 429/223 |
| 2015/0214550 | A1 | 7/2015 | Song et al. |
| 2015/0228970 | A1 | 8/2015 | Song et al. |
| 2015/0380768 | A1 | 12/2015 | Mizuno et al. |
| 2016/0013517 | A1 | 1/2016 | Nakazawa et al. |
| 2016/0049640 | A1* | 2/2016 | Takeuchi .............. H01M 4/485 252/182.1 |
| 2016/0372747 | A1 | 12/2016 | Rolff et al. |
| 2017/0005332 | A1 | 1/2017 | Chen et al. |
| 2017/0207444 | A1 | 7/2017 | Yanagihara et al. |
| 2019/0088940 | A1* | 3/2019 | Ceder .................. H01M 4/485 |

FOREIGN PATENT DOCUMENTS

| | | |
|---|---|---|
| JP | H01-209663 A | 8/1989 |
| JP | 7-037617 | 2/1995 |
| JP | H09-330720 A | 12/1997 |
| JP | H10-294100 A | 11/1998 |
| JP | H10-302768 A | 11/1998 |
| JP | H10-326621 A | 12/1998 |
| JP | H11-339800 A | 12/1999 |
| JP | H11-345615 A | 12/1999 |
| JP | 2000-012031 A | 1/2000 |
| JP | 2000-260433 A | 9/2000 |
| JP | 2001-516492 A | 9/2001 |
| JP | 2002-015776 A | 1/2002 |
| JP | 2003-229130 A | 8/2003 |
| JP | 3578066 B2 | 10/2004 |
| JP | 2004-311408 | 11/2004 |
| JP | 2004-349132 A | 12/2004 |
| JP | 2005-063953 A | 3/2005 |
| JP | 2006-261127 A | 9/2006 |
| JP | 2006-278341 A | 10/2006 |
| JP | 2007-018874 A | 1/2007 |
| JP | 2008-124038 A | 5/2008 |
| JP | 2009-187834 A | 8/2009 |
| JP | 2011-018656 A | 1/2011 |
| JP | 2012-014851 A | 1/2012 |
| JP | 2012-038564 A | 2/2012 |
| JP | 2012-156046 | 8/2012 |
| JP | 2013-222612 A | 10/2013 |
| JP | 2014-022191 A | 2/2014 |
| JP | 2014-116308 A | 6/2014 |
| JP | 2015-022958 A | 2/2015 |
| JP | 2015-069754 | 4/2015 |
| JP | 2015-111551 A | 6/2015 |
| JP | 2015-118892 A | 6/2015 |
| JP | 2015-128023 A | 7/2015 |
| JP | 2015-159109 A | 9/2015 |
| JP | 2016-033902 A | 3/2016 |
| WO | 1997/044842 A1 | 11/1997 |
| WO | 2012/014846 A1 | 2/2012 |
| WO | 2012/086602 A1 | 6/2012 |
| WO | 2012/176267 A1 | 12/2012 |
| WO | 2014/126256 A1 | 8/2014 |
| WO | 2014/156153 | 10/2014 |
| WO | 2014/157591 A1 | 10/2014 |

OTHER PUBLICATIONS

Coban, Hüseyin Can Çoban, "Metal Oxide (SnO2) Modified LiNi0.8Co0.2O2 Cathode Material for Lithium Ion Batteries," M.Sc. Thesis, Department of Nano Science and Nano Engineering, Nano Science and Nano Engineering Programme, Istanbul Technical University Graduate School of Science Engineering and Technology. May 2014.

The Extended European Search Report dated Jun. 1, 2018 for the related European Patent Application No. 16827416.5.

Ayuko Kitajou et al: "Electrochemical Performance of a Novel Cathode material "LiFeOF" for Li-ion Batteries", Electrochemistry, vol. 83, No. 10, Jan. 1, 2015 (Jan. 1, 2015), pp. 885-888, XP055416459.

International Search Report of PCT application No. PCT/JP2016/003215 dated Sep. 20, 2016.

International Search Report of PCT application No. PCT/JP2017/027997 dated Sep. 26, 2017.

International Search Report of PCT application No. PCT/JP2016/003954 dated Dec. 6, 2016.

International Search Report of PCT application No. PCT/JP2016/003949 dated Nov. 29, 2016.

International Search Report of PCT application No. PCT/JP2016/003955 dated Dec. 6, 2016.

International Search Report of PCT application No. PCT/JP2016/003948 dated Nov. 29, 2016.

International Search Report of PCT application No. PCT/JP2016/003952 dated Nov. 1, 2016.

International Search Report of PCT application No. PCT/JP2016/003953 dated Dec. 6, 2016.

International Search Report of PCT application No. PCT/JP2016/003951 dated Nov. 1, 2016.

International Search Report of PCT application No. PCT/JP2016/003950 dated Nov. 29, 2016.

International Search Report of PCT application No. PCT/JP2017/026210 dated Oct. 17, 2017.

M. Holzapfel et al., "Lithium-Ion Conductors of the System LiCo1-xFexO2, Preparation and Structural Investigation," Journal of Solid State Chemistry, 2001, 156, pp. 470-479.

(56) References Cited

OTHER PUBLICATIONS

S. Muhammad et al., "Deciphering the thermal behavior of lithium rich cathode material by in situ X-ray diffraction technique," Journal of Power Sources, 2015, 285, pp. 156-160.
International Search Report of PCT application No. PCT/JP2016/003956 dated Dec. 6, 2016.
Non-Final Office Action issued in U.S. Appl. No. 15/821,749, dated Jan. 16, 2020.
Notice of Allowance issued in U.S. Appl. No. 15/821,749, dated Apr. 15, 2020.
Non-Final Office Action issued in U.S. Appl. No. 15/821,745, dated Dec. 10, 2019.
Notice of Allowance issued in U.S. Appl. No. 15/821,745, dated Apr. 8, 2020.
Non-Final Office Action issued in U.S. Appl. No. 15/813,210, dated Jan. 2, 2020.
Non-Final Office Action issued in U.S. Appl. No. 15/813,204, dated Dec. 17, 2019.
Notice of Allowance issued in U.S. Appl. No. 15/813,204, dated Apr. 9, 2020.
Non-Final Office Action issued in U.S. Appl. No. 15/814,874, dated Jan. 2, 2020.
Non-Final Office Action issued in U.S. Appl. No. 15/811,685, dated Dec. 3, 2019.
Notice of Allowance issued in U.S. Appl. No. 15/811,685, dated Apr. 9, 2020.
Non-Final Office Action issued in U.S. Appl. No. 16/278,701, dated Aug. 27, 2019.
Non-Final Office Action issued in U.S. Appl. No. 16/278,701, dated Dec. 10, 2019.
Final Office Action issued in U.S. Appl. No. 16/278,701, dated Apr. 16, 2020.
Non-Final Office Action issued in U.S. Appl. No. 15/813,212, dated Dec. 31, 2019.
Non-Final Office Action issued in U.S. Appl. No. 15/811,683, dated Nov. 15, 2018.
Final Office Action issued in U.S. Appl. No. 15/811,683, dated Apr. 18, 2019.
Notice of Allowance issued in U.S. Appl. No. 15/811,683, dated Aug. 19, 2019.
Non-Final Office Action issued in U.S. Appl. No. 15/811,684, dated Dec. 5, 2019.
Final Office Action issued in U.S. Appl. No. 15/811,684, dated Mar. 13, 2020.
Notice of Allowance issued in U.S. Appl. No. 15/811,684, dated Apr. 8, 2020.
Non-Final Office Action issued in U.S. Appl. No. 15/838,360, dated Feb. 10, 2020.
Non-Final Office Action issued in U.S. Appl. No. 15/844,626, dated Mar. 18, 2020.
Non-Final Office Action issued in U.S. Appl. No. 15/813,218, dated Jan. 16, 2020.
Notice of Allowance issued in U.S. Appl. No. 15/813,210, dated Apr. 22, 2020.
Non-Final Office Action issued in U.S. Appl. No. 15/838,360, dated Apr. 22, 2020.
Notice of Allowance issued in U.S. Appl. No. 15/813,218, dated May 4, 2020.
Notice of Allowance issued in U.S. Appl. No. 15/813,212, dated May 1, 2020.
Notice of Allowance issued in U.S. Appl. No. 15/814,874, dated May 1, 2020.
English Translation of Chinese Search Report dated Jul. 13, 2020 for the related Chinese Patent Application No. 201680013989.7.
Synthesis and electrochemistry of cubic rocksalt Li—Ni—Ti—O compounds in the phase diagram of $LiNiO_2$—$LiTiO_2$—Li [$Li1/3Ti2/3$ ]$O_2$, Lianqi Zhang, et al Journal of power Sourses, 185(2008), P534-P541.
Written Opinion for Japanese Patent Application No. 2017-540475, dated Sep. 1, 2020; with English translation.
Shuhua Ren et al., Improved Voltage and Cycling for Intercalation in High-Capacity Disordered Oxyfluoride Cathodes Advanced Science, Jun. 12, 2015, vol. 2, Issue 10, 1500128.

\* cited by examiner

POSITIVE ELECTRODE ACTIVE MATERIAL AND BATTERY USING POSITIVE ELECTRODE ACTIVE MATERIAL

BACKGROUND

1. Technical Field

The present disclosure relates to a positive electrode active material for a battery and a battery using positive electrode active material.

2. Description of the Related Art

Japanese Unexamined Patent Application Publication No. 7-037617 has disclosed a positive electrode active material which has a crystal structure belonging to the R-3m space group and which is represented by a formula of $Li_wM_xO_yX_z$ (M represents Co, Ni, Mn, V, Fe, or Ti, X represents at least one type of halogen element, and $0.2 \leq w \leq 2.5$, $0.8 \leq x \leq 1.25$, $1 \leq y \leq 2$, and $0 < z \leq 1$ are satisfied).

SUMMARY

In related techniques, a battery having a high capacity has been desired.

In one general aspect, the techniques disclosed here feature a positive electrode active material containing a compound which has a crystal structure belonging to space group Fm-3m and which is represented by the following composition formula (1).

$$Li_xMe_yO_\alpha X_\beta \qquad \text{Formula (1)}$$

In the above formula (1), the Me represents one or more elements selected from the group consisting of Mn, Ni, Co, Fe, Al, Sn, Cu, Nb, Mo, Bi, Ti, V, Cr, Y, Zr, Zn, Na, K, Ca, Mg, Pt, Au, Ag, Ru, Ta, W, La, Ce, Pr, Sm, Eu, Dy, and Er. The X represents one element selected from the group consisting of Cl, Br, I, N, and S. The following conditions are satisfied: $0.5 \leq x \leq 1.5$; $0.5 \leq y \leq 1.0$; $1 \leq \alpha < 2$; and $0 < \beta \leq 1$.

A comprehensive or a concrete aspect of the present disclosure may be realized by a positive electrode active material, a battery, a method, or any combination thereof.

According to the present disclosure, a battery having a high capacity can be realized.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
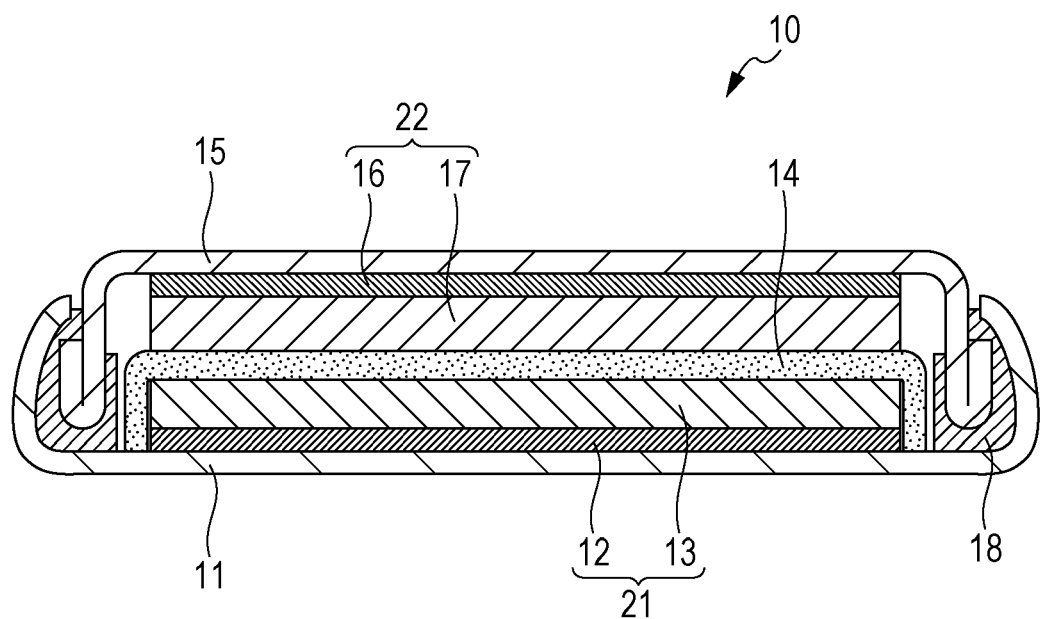
FIG. 1 is a cross-sectional view showing a schematic structure of one example of a battery according to Embodiment 2.

Hereinafter, embodiments of the present disclosure will be described.

Embodiment 1

A positive electrode active material for a battery according to Embodiment 1 contains a compound which has a crystal structure belonging to space group Fm-3m and which is represented by the following composition formula (1).

$$Li_xMe_yO_\alpha X_\beta \qquad \text{Formula (1)}$$

In the above formula (1), the Me represent one or more elements selected from the group consisting of Mn, Ni, Co, Fe, Al, Sn, Cu, Nb, Mo, Bi, Ti, V, Cr, Y, Zr, Zn, Na, K, Ca, Mg, Pt, Au, Ag, Ru, Ta, W, La, Ce, Pr, Sm, Eu, Dy, and Er.

In addition; the X represents one element selected from the group consisting of Cl, Br, I, N, and S.

Furthermore, in the positive electrode active material according to Embodiment 1, the above compound represented by the composition formula (1) satisfies the following conditions:
$0.5 \leq x \leq 1.5$;
$0.5 \leq y \leq 1.0$;
$1 \leq \alpha < 2$; and
$0 < \beta \leq 1$.

According to the structure described above, a battery having a high capacity can be realized.

For example, when a lithium ion battery is formed using a positive electrode active material which contains the above compound, this lithium ion battery has an oxidation-reduction potential of approximately 3.3 V (with reference to the potential of $Li/Li^+$). In addition, this lithium ion battery has an energy density of approximately 3,200 Wh/L or more.

In addition, in the above compound represented by the composition formula (1), the X represents one element selected from the group consisting of Cl, Br, I, N, and S. Since oxygen is substituted by one of the above elements each having a high electronegativity, a discharge capacity or an operating voltage is improved. In addition, since oxygen is substituted by an anion having a large ion radium, the crystal lattice is expanded, and the structure of the compound is stabilized. Hence, by the use of the positive electrode active material according to Embodiment 1, a battery having a high capacity can be realized.

In addition, in the above compound represented by the composition formula (1), when x is smaller than 0.5, the amount of Li to be used is decreased. Hence, the capacity becomes insufficient.

In addition, in the above compound represented by the composition formula (1), when x is larger than 1.5, an oxidation-reduction reaction of a transition metal to be used is suppressed. As a result, an oxidation-reduction reaction of oxygen is more utilized. Accordingly, the crystal structure is unstabilized. Hence, the capacity becomes insufficient.

In addition, in the above compound represented by the composition formula (1), when y is smaller than 0.5, the oxidation-reduction reaction of a transition metal to be used is suppressed. As a result, the oxidation-reduction reaction of oxygen is more utilized. Accordingly, the crystal structure is unstabilized. Hence, the capacity becomes insufficient.

In addition, in the above compound represented by the composition formula (1), when y is larger than 1.0, the amount of Li to be used is decreased. Hence, the capacity becomes insufficient.

In addition, in the above compound represented by the composition formula (1), when a is smaller than 1, a charge compensation by the oxidation-reduction of oxygen is decreased. Hence, the capacity becomes insufficient.

In addition, in the above compound represented by the composition formula (1), when α is 2 or more, the capacity by the oxidation-reduction of oxygen is excessively increased, and when Li is released, the structure is unstabilized. Hence, the capacity becomes insufficient.

In addition, in the above compound represented by the composition formula (1), when β is 0, since the influence of X having a high electronegativity disappears, a cation-anion interaction is decreased. Accordingly, when Li is released, the structure is unstabilized. Hence, the capacity becomes insufficient.

In addition, in the above compound represented by the composition formula (1), when β is larger than 2, since the influence of X having a high electronegativity is increased, the electron conductivity is decreased. Hence, the capacity becomes insufficient.

In addition, in the above compound represented by the composition formula (1), 1.8≤α≤1.97 may also be satisfied.

According to the structure described above, a battery having a higher capacity can be realized.

In addition, in the above compound represented by the composition formula (1), 0.03≤β≤0.2 may also be satisfied.

According to the structure described above, a battery having a higher capacity can be realized.

In addition, in the above compound represented by the composition formula (1), 2≤α/β≤100 may also be satisfied.

According to the structure described above, a battery having a higher capacity can be realized.

When α/β is 2.0 or more, the charge compensation by the oxidation-reduction of oxygen is increased. In addition, since the influence of X having a high electronegativity is decreased, the electron conductivity is increased. Hence, the capacity becomes sufficient.

When α/β is 100 or less, the capacity by the oxidation-reduction of oxygen is suppressed from being excessively increased, and when Li is released, the structure can be suppressed from being unstabilized. In addition, since the influence of X having a high electronegativity is increased, the cation-anion interaction is increased. Accordingly, when Li is released, the structure can be suppressed from being unstabilized. Hence, the capacity becomes sufficient.

In addition, in the above compound represented by the composition formula (1), 9≤α/β≤66 may also be satisfied.

According to the structure described above, a battery having a higher capacity can be realized.

In addition, in the above compound represented by the composition formula (1), 0.5≤x/y≤3.0 may also be satisfied.

According to the structure described above, a battery having a higher capacity can be realized.

When x/y is 0.5 or more, the amount of Li to be used is increased. In addition, a diffusion path of Li is not disturbed.

when x/y is 3.0 or less, the oxidation-reduction reaction of a transition metal to be used is promoted. As a result, the use of the oxidation-reduction reaction of oxygen can be decreased. In addition, the crystal structure can be suppressed from being unstabilized when Li is released during charge, and a Li insertion efficiency during discharge can be suppressed from being decreased.

In addition, in the above compound represented by the composition formula (1), 1.5≤x/y≤2.0 may also be satisfied. According to the structure described above, a battery having a higher capacity can be realized.

In addition, in the above compound represented by the composition formula (1), 1.5≤x/y≤1.56 may also be satisfied. According to the structure described above, a battery having a higher capacity can be realized.

In addition, in the positive electrode active material according to Embodiment 1, the compound represented by the composition formula (1) is believed that Li and Me are located at the same site.

Hence, in the compound represented by the composition formula (1), when 1.0<x/y is satisfied, compared to $LiCoO_2$ which is one example of a related positive electrode active material, a larger amount of Li can be inserted and released per one Me element.

Accordingly, when 1.0<x/y is satisfied, the compound represented by the composition formula (1) is suitable to realize a lithium ion battery having a high capacity.

However, for example, in a layered structure defined by the R-3m space group, when a large amount of Li is pulled out, the layered structure cannot be maintained and destroyed.

On the other hand, as is the positive electrode active material according to Embodiment 1, when the crystal structure is a cubic rock salt structure defined by space group Fm-3m, even if a large amount of Li is pulled out, the structure is not destroyed and can be stably maintained. In addition, by the cubic rock salt crystal structure defined by space group Fm-3m, it is believed that elements having different ion radiuses are likely to be mixed with each other. By the reasons described above, a battery having a high capacity can be realized.

In addition, in the above compound represented by the composition formula (1), 0.75≤(x+y)/(α+β)≤1.15 may also be satisfied.

According to the structure described above, a battery having a higher capacity can be realized.

When (x+y)/(α+β) is 0.75 or more, the phase separation is suppressed during synthesis, and impurities are suppressed from being generated. Hence, the capacity becomes sufficient.

When (x+y)/(α+β) is 1.15 or less, the structure in which anions are deficient is suppressed from being formed, the crystal structure is suppressed from being unstabilized when Li is released during charge, and the Li insertion efficiency during discharge can be increased. Hence, the capacity becomes sufficient.

In other words, in the above compound represented by the composition formula (1), when α+β=2 is satisfied, 1.5≤x+y≤2.3 may also be satisfied.

According to the structure described above, a battery having a higher capacity can be realized.

In addition, in the above compound represented by the composition formula (1), when α+β=2 is satisfied, 1.9≤x+y≤2.0 may also be satisfied.

According to the structure described above, a battery having a higher capacity can be realized.

In addition, in the above compound represented by the composition formula (1), x+y=α+β=2 may also be satisfied.

According to the structure described above, a battery having a higher capacity can be realized.

In addition, in the above compound represented by the composition formula (1), the Me may include Mn.

According to the structure described above, a battery having a higher capacity can be realized.

The degree of an Mn orbit overlapping with the oxygen orbit is high, for example, as compared to the degree of a Co or a Ni orbit, and hence, it is believed that an increase in capacity by the oxidation-reduction reaction of oxygen can be obtained.

In addition, in the above compound represented by the composition formula (1), the X may be Cl.

According to the structure described above, a battery having a higher capacity can be realized.

Compared to the other elements, since Cl has a small ion radius and a high electronegativity, it is believed that an increase in capacity of the battery can be obtained.

In addition, the positive electrode active material according to Embodiment 1 may contain the compound described above as a primary component.

According to the structure described above, a battery having a higher capacity can be realized.

In this embodiment, the "primary component" indicates that the positive electrode active material according to Embodiment 1 contains, for example, 90 percent by weight or more of the compound described above.

In addition, while containing the above compound as a primary component, the positive electrode active material according to Embodiment 1 may further contain other materials. Examples of such materials include: inevitable impurities; starting raw materials to be used for synthesis of the above compound; and byproducts and decomposed products to be formed therefrom.

<Method for Forming Compound>

Hereinafter, one example of a method for manufacturing the above compound contained in the positive electrode active material according to Embodiment 1 will be described.

The compound represented by the composition formula (1) may be formed, for example, by the following method.

Raw materials containing Li, X, and Me are prepared.

Examples of the raw material containing Li include: an oxide, such as $Li_2O$ or $Li_2O_2$; a salt, such as LiF, $Li_2CO_3$ or LiOH; and a lithium composite transition metal oxide, such as $LiMeO_2$ or $LiMe_2O_4$.

Examples of the raw material containing X include: a halogenated lithium; a transition metal halogenated compound; a transition metal sulfide; and a transition metal nitride.

Examples of the raw material containing Me include: oxides, such as $Me_2O_3$, having various oxidation states; a salt, such as $MeCO_3$ or $MeNO_3$; a hydroxide, such as $Me(OH)_2$ or MeOOH; and a Li composite transition metal oxide, such as $LiMeO_2$ or $LiMe_2O_4$.

When Me represents Mn, examples of a raw material containing Mn include: manganese oxides, such as $Mn_2O_3$, having various oxidation states; a salt, such as $MnCO_3$ or $MnNO_3$; a hydroxide, such as $Mn(OH)_2$ or MnOOH; and a Li composite transition metal oxide, such as $LiMnO_2$ or $LiMn_2O_4$.

Those raw materials were weighed so as to have molar ratios shown in the composition formula (1).

Accordingly, the "x, y, α, and β" of the composition formula (1) may be varied within the range shown in the composition formula (1).

The raw materials thus weighed are mixed together by a dry method or a wet method so as to perform a mechanochemical reaction for 10 hours or more, and as a result, the compound represented by the composition formula (1) can be obtained. This mixing may be performed, for example, using a mixing device, such as a ball mill.

By selecting the raw materials to be used and by adjusting mixing conditions of a raw material mixture, the compound represented by the composition formula (1) can be substantially obtained.

When a lithium transition metal composite oxide is used as a precursor, mixing energy of each element can be more reduced. Accordingly, a compound represented by the composition formula (1) having a higher purity can be obtained.

The composition of the compound represented by the composition formula (1) thus obtained can be determined, for example, by an ICP emission spectroscopy and an inert gas fusion-infrared adsorption method.

In addition, by a powder X-ray analysis, the space group of the crystal structure can be determined, so that the compound represented by the composition formula (1) can be identified.

As described above, the method for manufacturing the positive electrode active material according to one aspect of Embodiment 1 includes a step (a) of preparing raw materials and a step (b) of obtaining a positive electrode active material by a mechanochemical reaction of the raw materials.

In addition, the step (a) described above may include a step of preparing a mixed raw material in which the raw materials containing Li, X, and Me are mixed together so that the molar ratio of Li to Me is 1.31 to 2.33.

In this case, the step (a) described above may include a step of forming a lithium transition metal composite oxide to be used as the raw material by a known method.

In addition, the step (a) described above may include a step of preparing a mixed raw material by mixing so that the molar ratio of Li to Me is 1.7 to 2.0.

In addition, the step (b) described above may include a step of performing a mechanochemical reaction of the raw materials using a ball mill.

As described above, the compound represented by the composition formula (1) may be synthesized by performing a mechanochemical reaction of precursors (such as LiCl, $Li_2O$, a transition metal oxide, and a lithium composite transition metal) using a planetary ball mill.

In this case, by adjusting the mixing ratio of the precursors, a larger amount of Li atoms may be contained.

On the other hand, in the case in which the above precursors are reacted by a solid phase method, a more stable compound may be obtained by decomposition.

That is, for example, by a formation method in which the precursors are reacted by a solid phase method, a compound which has a crystal structure belonging to the space group Fm-3m and which is represented by the composition formula (1) cannot be obtained.

Embodiment 2

Hereinafter, Embodiment 2 will be described. In addition, description duplicated with that of the above Embodiment 1 will be appropriately omitted.

A battery according to Embodiment 2 includes a positive electrode containing the positive electrode active material according to Embodiment 1, a negative electrode, and an electrolyte.

By the structure described above, a battery having a high capacity can be realized.

The battery according to Embodiment 2 may be formed, for example, as a lithium ion secondary battery, a non-aqueous electrolyte secondary battery, or an all-solid battery.

That is, in the battery according to Embodiment 2, for example, the negative electrode may contain a negative electrode active material capable of storing and releasing lithium.

In addition, in the battery according to Embodiment 2, the electrolyte may be a non-aqueous electrolyte (such as a non-aqueous electrolyte liquid).

In addition, in the battery according to Embodiment 2, the electrolyte may be a solid electrolyte.

FIG. 1 is a cross-sectional view showing a schematic structure of a battery 10 which is one example of the battery according to Embodiment 2.

As shown in FIG. 1, the battery 10 includes a positive electrode 21, a negative electrode 22, a separator 14, a case 11, a sealing body 15, and a gasket 18.

The separator 14 is disposed between the positive electrode 21 and the negative electrode 22.

In the positive electrode 21, the negative electrode 22, and the separator 14, for example, a non-aqueous electrolyte (such as a non-aqueous electrolyte liquid) is impregnated.

The positive electrode 21, the negative electrode 22, and the separator 14 forms an electrode group.

The electrode group is received in the case 11.

The gasket 18 and the sealing body 15 seal the case 11.

The positive electrode 21 includes a positive electrode collector 12 and a positive electrode active material layer 13 disposed thereon.

The positive electrode collector 12 is formed, for example, from a metal material (such as aluminum, stainless steel, or an aluminum alloy).

In addition, the positive electrode collector 12 may be omitted, and the case 11 itself may be used as the positive electrode collector.

The positive electrode active material layer 13 contains the positive electrode active material according to Embodiment 1.

The positive electrode active material layer 13 may contain, if needed, for example, additives (such as an electrically conductive agent, an ion conductive auxiliary agent, a binding agent, and so forth).

The negative electrode 22 includes a negative electrode collector 16 and a negative electrode active material layer 17 disposed thereon.

The negative electrode collector 16 is formed, for example, from a metal material (such as aluminum, stainless steel, or an aluminum alloy).

In addition, the negative electrode collector 16 may be omitted, and the sealing body 15 itself may be used as the negative electrode collector.

The negative electrode active material layer 17 contains a negative electrode active material.

The negative electrode active material layer 17 may contain, if needed, for example, additives (such as an electrically conductive agent, an ion conductive auxiliary agent, a binding agent, and so forth).

As the negative electrode active material, for example, a metal material, a carbon material, an oxide, a nitride, a tin compound, or a silicon compound may be used.

The metal material may be a metal element. Alternatively, the metal material may be an alloy. Examples of the metal material include: a lithium metal; and a lithium alloy.

Examples of the carbon material include: natural graphite; coke; graphitizing carbon; carbon fibers; spherical carbon; artificial graphite; and amorphous carbon.

In view of the capacity density, one or more selected from the group consisting of silicon (Si), tin (Sn), a silicon compound, and a tin compound may be used as the negative electrode active material. A silicon compound and a tin compound each may be either an alloy or a solid solution.

Examples of the silicon compound include $SiO_x$ (where $0.05<x<1.95$). In addition, a compound (such as an alloy or a solid solution) obtained by partially substituting silicon of $SiO_x$ by another element may also be used as the negative electrode active material. In this case, the another element is at least one selected from the group consisting of boron, magnesium, nickel, titanium, molybdenum, cobalt, calcium, chromium, copper, iron, manganese, niobium, tantalum, vanadium, tungsten, zinc, carbon, nitrogen, and tin.

Examples of the tin compound include: $Ni_2Sn_4$; $Mg_2Sn$; $SnO_x$ (where $0<x<2$); $SnO_2$; and $SnSiO_3$. One type of tin compound selected from those mentioned above may be used alone. Alternatively, at least two types of tin compounds selected from those mentioned above may also be used in combination.

In addition, the shape of the negative electrode active material is not particularly limited. As the negative electrode active material, a negative electrode active material having a known shape (grain shape, fiber shape, or the like) may be used.

In addition, a method to compensate (that is, to store) lithium in the negative electrode active material layer 17 is not particularly limited. As this method, in particular, there may be mentioned a method (a) in which lithium is deposited on the negative electrode active material layer 17 by a vapor phase method, such as a vacuum deposition method, and a method (b) in which lithium metal foil and the negative electrode active material layer 17 in contact therewith are both heated. In each method, lithium can be diffused to the negative electrode active material layer 17 by heat. In addition, a method in which lithium is electrochemically stored in the negative electrode active material layer 17 may also be mentioned. In particular, a battery is assembled using a negative electrode 22 containing no lithium and lithium metal foil (positive electrode). Subsequently, this battery is charged so that lithium is stored in the negative electrode 22.

As the binding agent for the positive electrode 21 and the negative electrode 22, for example, there may be used a poly(vinylidene fluoride), a polytetrafluoroethylene, a polyethylene, a polypropylene, an aramid resin, a polyamide, a polyimide, a poly(amide imide), a polyacrylonitrile, a poly(acrylic acid), a poly(methyl acrylate), a poly(ethyl acrylate), a poly(hexyl acrylate), a poly(methacrylic acid), a poly(methyl methacrylate), a poly(ethyl methacrylate), a poly(hexyl methacrylate), a poly(vinyl acetate), a poly(vinyl pyrrolidone), a polyether, a poly(ether sulfone), a hexafluoropolypropylene, a styrene-butadiene rubber, or a carboxymethyl cellulose. In addition, as the binding agent, there may also be used a copolymer formed from at least two types of materials selected from the group consisting of tetrafluoroethylene, hexafluoroethane, hexafluoropropylene, a perfluoroalkyl vinyl ether, vinylidene fluoride, chlorotrifluoroethylene, ethylene, propylene, pentafluoropropylene, fluoromethyl vinyl ether, acrylic acid, and hexadiene. Furthermore, a mixture formed from at least two types of materials selected from the above materials may also be used as the binding agent.

As the electrically conductive agent for the positive electrode 21 and the negative electrode 22, for example, one or more selected from the group consisting of graphite, carbon black, electrically conductive fibers, fluorinated graphite, a metal powder, electrically conductive whiskers, electrically conductive metal oxides, and organic electrically conductive materials may be used. Examples of the graphite include: natural graphite; and artificial graphite. Examples of the carbon black include: acetylene black; ketjen black (registered trade name); channel black; furnace black; lamp black; and thermal black. Examples of the metal powder include an aluminum powder. Examples of the electrically conductive whickers include: zinc oxide whiskers; and potassium titanate whiskers. Examples of the electrically conductive metal oxide include titanium oxide. Examples of the organic electrically conductive material include a phenylene derivative.

As the separator 14, a material having a high ion permeability and a sufficient mechanical strength may be used.

Example of the material described above include: a fine porous thin film; a woven cloth; and a non-woven cloth. In particular, the separator 14 is preferably formed from a polyolefin, such as a polypropylene and/or a polyethylene. The separator 14 formed from a polyolefin has not only excellent durability but also a shutdown function which works when heating is excessively performed. The thickness of the separator 14 is, for example, in a range of 10 to 300 μm (or 10 to 40 μm). The separator 14 may be a monolayer film formed from one type of material. Alternatively, the separator 14 may be a composite film (or a multilayer film) formed from at least two types of materials. A porosity of the separator 14 is for example, in a range of 30% to 70% (or 35% to 60%). The "porosity" indicates a volume rate of pores in the total volume of the separator 14. The "porosity" may be measured, for example, by a mercury intrusion method.

The non-aqueous electrolyte liquid contains a non-aqueous solvent and a lithium salt dissolved therein.

As the non-aqueous solvent, for example, a cyclic carbonate ester solvent, a chain carbonate ester solvent, a cyclic ether solvent, a chain ether solvent, a cyclic ester solvent, a chain ester solvent, or a fluorinated solvent may be used.

Examples of the cyclic carbonate ester solvent include: ethylene carbonate; propylene carbonate; and a butylene carbonate.

Examples of the chain carbonate ester solvent include: dimethyl carbonate; ethyl methyl carbonate; and diethyl carbonate.

Examples of the cyclic ether solvent include: tetrahydrofuran; 1,4-dioxane; and 1,3-dioxolane.

Examples of the chain ether solvent include: 1,2-dimethxyethane; and 1,2-diethoxydiethane.

Examples of the cyclic ester solvent include γ-butyrolactone.

Examples of the chain ester solvent include methyl acetate.

Examples of the fluorinated solvent include: fluoroethylene carbonate; methyl fluoropropionate; fluorobenzene; fluoroethyl methyl carbonate; and fluorodimethylene carbonate.

As the non-aqueous solvent, one type of non-aqueous solvent selected from those mentioned above may be used alone. Alternatively, as the non-aqueous solvent, at least two types of non-aqueous solvents selected from those mentioned above may also be used in combination.

In the non-aqueous electrolyte liquid, at least one type of fluorinated solvent selected from the group consisting of fluoroethylene carbonate, methyl fluoropropionate, fluorobenzene, fluoroethyl methyl carbonate, and fluorodimethylene carbonate may be contained.

When at least one of the fluorinated solvents mentioned above is contained in the non-aqueous electrolyte liquid, the oxidation resistance thereof is improved.

As a result, even when being charged at a high voltage, the battery 10 can be stably operated.

In addition, in the battery according to Embodiment 2, the electrolyte may be a solid electrolyte.

As the solid electrolyte, for example, an organic polymer solid electrolyte, an oxide solid electrolyte, or a sulfide solid electrolyte may be used.

As the organic polymer solid electrolyte, for example, a compound containing a high molecular weight compound and a lithium salt may be used.

The high molecular weight compound may have an ethylene oxide structure. Since having an ethylene oxide structure, a large amount of a lithium salt can be contained, and hence, the ion conductivity can be further increased.

As the oxide solid electrolyte, for example, there may be used a NASICON type solid electrolyte represented by $LiTi_2(PO_4)_3$ or its elemental substituent, a $(LaLi)TiO_3$-based perovskite type solid electrolyte, a LISICON type solid electrolyte represented by $Li_{14}ZnGe_4O_{16}$, $Li_4SiO_4$, $LiGeO_4$, or its elemental substituent, a garnet type solid electrolyte represented by $Li_7La_3Zr_2O_{12}$ or its elemental substituent, $Li_3N$ or its H substituent, or $Li_3PO_4$ or its N substituent.

As the sulfide solid electrolyte, for example, there may be used one or more selected from the group consisting of $Li_2S$—$P_2S_5$, $Li_2S$—$SiS_2$, $Li_2S$—$B_2S_3$, $Li_2S$—$GeS_2$, $Li_{3.25}Ge_{0.25}P_{0.75}S_4$, and $Li_{10}GeP_2S_{12}$ may be used. In addition, to those compounds mentioned above, for example, one or more selected from the group consisting of LiX (X: F, Cl, Br, or I), $MO_y$, and $Li_xMO_y$ (M: one of P, Si, Ge, B, Al, Ga, and In) (x, y: natural number) may also be added.

Among those electrolytes mentioned above, in particular, the sulfide solid electrolyte has excellent moldability and a high ion conductivity. Hence, when the sulfide solid electrolyte is used as the solid electrolyte, a battery having a higher energy density can be realized.

In addition, among the sulfide solid electrolytes, $Li_2S$—$P_2S_5$ has a high electrochemical stability and a higher ion conductivity. Hence, as the solid electrolyte, when $Li_2S$—$P_2S_5$ is used, a battery having a higher energy density can be realized.

In addition, the solid electrolyte layer may also contain the non-aqueous electrolyte liquid described above.

Since the solid electrolyte layer contains a non-aqueous electrolyte, the transportation of lithium ions between the active material and the solid electrolyte can be easily performed. As a result, a battery having a higher energy density can be realized.

In addition, the solid electrolyte layer may also contain, besides the solid electrolyte, a gel electrolyte, and/or an ionic liquid, and/or the like.

As the gel electrolyte, an electrolyte in which a non-aqueous electrolyte liquid is impregnated in a polymer material may be used. As the polymer material, for example, a poly(ethylene oxide), a polyacrylonitrile, a poly(vinylidene fluoride), a poly(methyl methacrylate), or a polymer having an ethylene oxide bond may be used.

Examples of a cation forming the ionic liquid include: an aliphatic chain quaternary salt, such as a tetraalkyl ammonium or a tetraalkyl phosphonium; an aliphatic cyclic ammonium, such as a pyrrolidinium, a morpholinium, a imidazolinium, a tetrahydropyrimidinium, a piperadinium, or a piperidinium; and a nitrogen-containing heterocyclic aromatic cation, such as a pyridinium or imidazolium. Examples of an anion forming the ionic liquid include: $PF_6^-$; $BF_4^-$; $SbF_6^-$; $AsF_6^-$; $SO_3CF_3^-$; $N(SO_2CF_3)_2^-$; $N(SO_2C_2F_5)_2^-$; $N(SO_2CF_3)(SO_2C_4F_9)^-$; and $C(SO_2CF_3)_3^-$. In addition, the ionic liquid may also contain a lithium salt.

Examples of the lithium salt include: $LiPF_6^-$; $LiBF_4^-$; $LiSbF_6^-$; $LiAsF_6^-$; $LiSO_3CF_3^-$; $LiN(SO_2CF_3)_2^-$; $LiN(SO_2C_2F_5)_2^-$; $LiN(SO_2CF_3)(SO_2C_4F_9)^-$; and $LiC(SO_2CF_3)_3$. As the lithium salt, one type of lithium salt selected from those mentioned above may be used alone. Alternatively, as the lithium salt, a mixture containing at least two types of those mentioned above may also be used. The concentration of the lithium salt is, for example, in a range of 0.5 to 2 mole/liter.

EXAMPLES

Example 1

[Formation of Positive Electrode Active Material]

$MnCl_2$, $LiMnO_2$, $Li_2MnO_3$, and $Li_2O$ were weighed at a molar ratio of 1:16:15:1, respectively.

The raw material thus obtained was charged in a 45-cc zirconia-made container together with an appropriate amount of zirconia-made balls having a diameter of 3 mm and was sealed in an argon glove box.

The raw material was recovered from the argon glove box and was then processed by a planetary ball mill at 600 rpm for 30 hours.

A compound obtained thereby was analyzed using a powder X-ray diffraction measurement.

Figure 2:
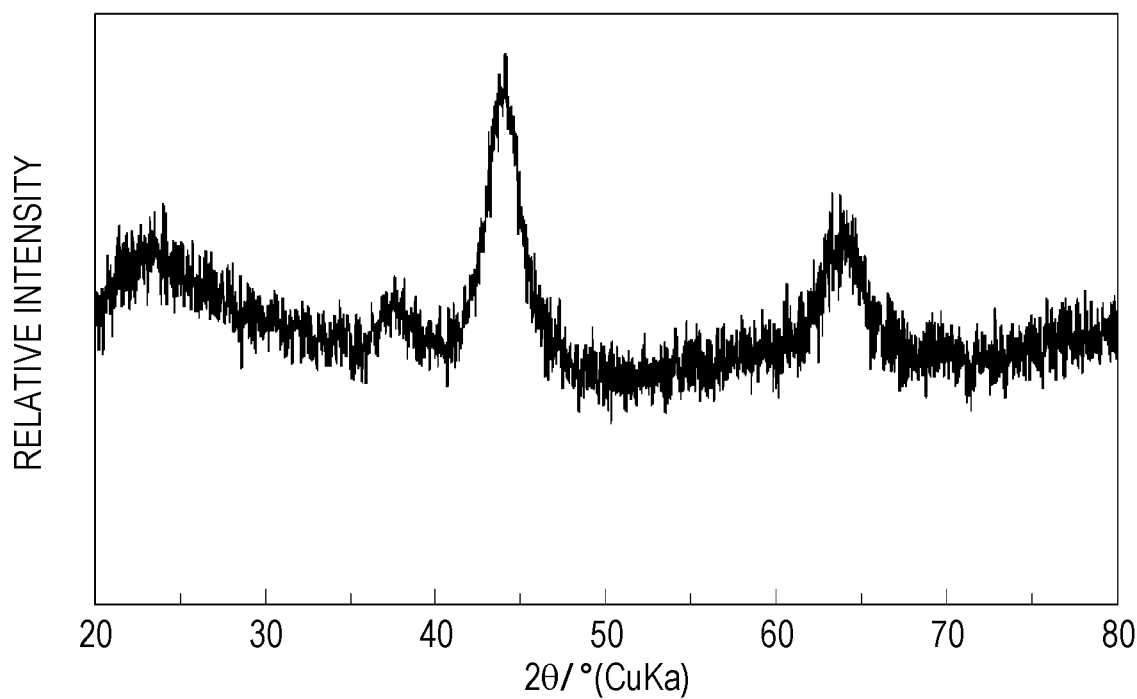
FIG. 2 is a view showing a powder X-ray diffraction chart of a positive electrode active material according to Example 1.

The measurement result is shown in FIG. 2.

The space group of the compound thus obtained was Fm-3m.

In addition, the composition of the compound thus obtained was obtained by an ICP emission spectroscopy and an inert gas fusion-infrared adsorption method.

As a result, it was found that the composition of the compound thus obtained was $Li_{1.2}Mn_{0.8}O_{1.95}Cl_{0.05}$.

[Formation of Battery]

Next, 70 parts by mass of the above compound, 20 parts by mass of an electrically conductive agent, 10 parts by mass of a poly(vinylidene fluoride) (PVDF), and an appropriate amount of 2-methylpyrrolidone (NMP) were mixed together. Accordingly, a positive electrode mixture slurry was obtained.

The positive electrode mixture slurry was applied onto one surface of a positive electrode collector formed of aluminum foil having a thickness of 20 μm.

The positive electrode mixture slurry was dried and then rolled, so that a 60 μm-thick positive electrode plate including a positive electrode active material layer was obtained.

The positive electrode plate thus obtained was punched out into a disc having a diameter of 12.5 mm, so that a positive electrode was obtained.

In addition, lithium metal foil having a thickness of 300 μm was punched out into a disc having a diameter of 14.0 mm, so that a negative electrode was obtained.

In addition, fluoroethylene carbonate (FEC), ethylene carbonate (EC), and ethyl methyl carbonate (EMC) were mixed together at a volume ratio of 1:1:6, respectively, so that a non-aqueous solvent was obtained.

$LiPF_6$ was dissolved in this non-aqueous solvent at a concentration of 1.0 mole/liter, so that a non-aqueous electrolyte liquid was obtained.

The non-aqueous electrolyte liquid thus obtained was impregnated into a separator (manufactured by Celgard, LLC., product No. 2320, thickness: 25 μm).

Celgard (registered trade name) 2320 is a three-layered separator formed of a polypropylene layer, a polyethylene layer, and a polypropylene layer.

By the use of the positive electrode, the negative electrode, and the separator described above, a CR2032 type coin battery was formed in a dry box in which the dew point was controlled at −50° C.

Examples 2 to 16

The type of Me, the type of X, and the ratio of each element were changed from those of the above Example 1.

In Table 1, the compositions of the positive electrode active materials of Examples 2 to 16 are shown.

Except that described above, positive electrode active materials of Examples 2 to 16 were each synthesized in a manner similar to that of the above Example 1.

In addition, by the use of the positive electrode active materials of Examples 2 to 16, coin batteries were each formed in a manner similar to that of the above Example 1.

Comparative Example 1

$MnCl_2$, $LiMnO_2$, $Li_2MnO_3$, and $Li_2O$ were weighed at a molar ratio of 1:16:15:1, respectively.

A raw material mixture thus obtained was fired at 800° C. in an inert gas atmosphere. Accordingly, grains of a lithium manganese composite compound were obtained.

The space group of the grains of the lithium manganese composite compound thus obtained was R-3m.

By the use of the grain of the lithium manganese composite compound thus obtained as a positive electrode active material, a coin battery was formed in a manner similar to that of the above Example 1.

Comparative Example 2

Lithium cobaltate ($LiCoO_2$) was obtained using a known method.

The space group of the lithium cobaltate thus obtained was R-3m.

The lithium cobaltate thus obtained was used as a positive electrode active material, and a coin battery was formed in a manner similar to that of the above Example 1.

<Evaluation of Battery>

A current density of the positive electrode was set to 0.5 $mA/cm^2$, and the battery of Example 1 was charged until the voltage reached 5.2 V.

Subsequently, the discharge cut-off voltage was set to 1.5 V, and the battery of Example 1 was discharged at a current density of 0.5 $mA/cm^2$.

The initial energy density thus obtained was 4,500 Wh/L.

A current density of the positive electrode was set to 0.5 $mA/cm^2$, and the battery of Comparative Example 1 was charged until the voltage reached 5.2 V.

Subsequently, the discharge cut-off voltage was set to 1.5 V, and the battery of Comparative Example 1 was discharged at a current density of 0.5 $mA/cm^2$.

The initial energy density of the battery of Comparative Example 1 was 2,000 Wh/L.

In addition, a current density of the positive electrode was set to 0.5 $mA/cm^2$, and the battery of Comparative Example 2 was charged until the voltage reached 4.3 V.

Subsequently, the discharged cut-off voltage was set to 2.5 V, and the battery of Comparative Example 2 was discharged at a current density of 0.5 $mA/cm^2$.

The initial energy density of the battery of Comparative Example 2 was 2,500 Wh/L.

In addition, in a manner similar to that of Example 1, the initial energy density of the coin battery of each of Examples 2 to 16 was measured.

The results are shown in Table 1.

TABLE 1

|  | Composition | x/y | α/β | (x + y)/ (α + β) | Space Group | Energy Density (Wh/L) |
|---|---|---|---|---|---|---|
| Example 1 | $Li_{1.2}Mn_{0.8}O_{1.95}Cl_{0.05}$ | 1.50 | 39 | 1.00 | Fm-3m | 4500 |
| Example 2 | $Li_{1.2}Mn_{0.8}O_{1.95}Br_{0.05}$ | 1.50 | 39 | 1.00 | Fm-3m | 4050 |
| Example 3 | $Li_{1.2}Mn_{0.8}O_{1.95}I_{0.05}$ | 1.50 | 39 | 1.00 | Fm-3m | 3800 |
| Example 4 | $Li_{1.2}Mn_{0.8}O_{1.95}N_{0.05}$ | 1.50 | 39 | 1.00 | Fm-3m | 3970 |
| Example 5 | $Li_{1.2}Mn_{0.8}O_{1.95}S_{0.05}$ | 1.50 | 39 | 1.00 | Fm-3m | 4000 |
| Example 6 | $Li_{1.2}Co_{0.8}O_{1.95}Cl_{0.05}$ | 1.50 | 39 | 1.00 | Fm-3m | 3760 |
| Example 7 | $Li_{1.2}Ni_{0.2}Mn_{0.6}O_{1.95}Cl_{0.05}$ | 1.50 | 39 | 1.00 | Fm-3m | 4300 |
| Example 8 | $Li_{1.2}Co_{0.2}Mn_{0.6}O_{1.95}Br_{0.05}$ | 1.50 | 39 | 1.00 | Fm-3m | 3920 |
| Example 9 | $Li_{1.2}Mn_{0.8}O_{1.97}Cl_{0.03}$ | 1.50 | 66 | 1.00 | Fm-3m | 4000 |
| Example 10 | $Li_{1.2}Mn_{0.8}O_{1.8}Cl_{0.2}$ | 1.50 | 9 | 1.00 | Fm-3m | 3600 |
| Example 11 | $LiMnO_{1.95}Cl_{0.05}$ | 1.00 | 39 | 1.00 | Fm-3m | 3200 |
| Example 12 | $Li_{1.5}Mn_{0.5}O_{1.95}Cl_{0.05}$ | 3.00 | 39 | 1.00 | Fm-3m | 3200 |
| Example 13 | $Li_{0.5}MnO_{1.95}Cl_{0.05}$ | 0.50 | 39 | 0.75 | Fm-3m | 3670 |
| Example 14 | $Li_{1.4}Mn_{0.9}O_{1.95}Cl_{0.05}$ | 1.56 | 39 | 1.15 | Fm-3m | 3790 |
| Example 15 | $Li_{1.33}Mn_{0.67}O_{1.95}Cl_{0.05}$ | 2.00 | 39 | 1.00 | Fm-3m | 3400 |
| Example 16 | $Li_{1.14}Mn_{0.76}O_{1.95}Cl_{0.05}$ | 1.50 | 39 | 0.95 | Fm-3m | 3770 |
| Comparative Example 1 | $Li_{1.2}Mn_{0.8}O_{1.95}Cl_{0.05}$ | 1.50 | 39 | 1.00 | R-3m | 2000 |
| Comparative Example 2 | $LiCoO_2$ | 1.00 | — | 1.00 | R-3m | 2500 |

As shown in Table 1, the batteries of Examples 1 to 16 each have an initial energy density of 3,200 to 4,500 Wh/L.

That is, the initial energy density of the battery of each of Examples 1 to 16 is higher that the initial energy density of the battery of each of Comparative Examples 1 and 2.

The reason for this is believed that since the space group of each of Examples 1 to 16 is Fm-3m, even if a large amount of Li is pulled out, the structure is not destroyed and can be stably maintained, and hence, a battery having a high energy density can be realized.

In addition, in Examples 1 to 16, it is believed that since a large amount of Li is contained in the crystal structure, or since oxygen is substituted by an element having a high electronegativity, the discharge capacity or the operating voltage is improved, and the energy density is increased.

In addition, as shown in Table 1, the initial energy density of the battery of each of Examples 2 and 3 is lower than that of the battery of Example 1.

The reason for this is believed that in Examples 2 and 3, since oxygen is substituted by a halogen element having an ion radius larger than that of chlorine, a diffusion path of Li ions is disturbed.

In addition, as shown in Table 1, the initial energy density of the battery of each of Examples 4 and 5 is lower than that of the battery of Example 1.

The reason for this is believed that in Examples 4 and 5, since oxygen is substituted by an element having a lower electronegativity than that of chlorine, the operating voltage is decreased.

In addition, as shown in Table 1, the initial energy density of the battery of each of Examples 6 to 8 is lower than that of the battery of Example 1.

The reason for this is believed that in Examples 6 to 8, since Co or Ni is used, the degree of its orbit overlapping with the oxygen orbit is lower than the degree of the Mn orbit, and hence, the capacity by the oxidation-reduction reaction of oxygen cannot be sufficiently obtained.

In addition, as shown in Table 1, the initial energy density of the battery of Example 9 is lower than that of the battery of Example 1.

The reason for this is believed that in Example 9, the value of α/β is large. That is, it is believed that since the capacity by the oxidation-reduction reaction of oxygen is excessively increased, and/or since the cation-anion interaction is decreased due to the decrease in influence of X having a high electronegativity, when Li is released, the structure is unstabilized as compared to that of Example 1.

In addition, as shown in Table 1, the initial energy density of the battery of Example 10 is lower than that of the battery of Example 1.

The reason for this is believed that in Example 10, the value of α/β is small. That is, it is believed that since the charge compensation by the oxidation-reduction reaction of oxygen is decreased, and/or since the electron conductivity is decreased due to an increase in influence of X having a high electronegativity, the initial energy density is decreased. In addition, it is also believed that since the substitution amount of chlorine having a large ion radius as compared to that of oxygen is increased, the diffusion of Li ions is disturbed.

In addition, as shown in Table 1, the initial energy density of the battery of Example 11 is lower than that of the battery of Example 1.

The reason for this is believed that in Example 11, since the Li/Mn ratio is 1, a percolation path of Li cannot be appropriately secured, and the Li ion diffusivity is decreased.

In addition, as shown in Table 1, the initial energy density of the battery of Example 12 is lower than that of the battery of Example 1.

The reason for this is believed that in Example 12, since the Li/Mn ratio is 3, the oxidation-reduction reaction of a transition metal to be used is suppressed, and the oxidation-reduction reaction of oxygen is more utilized. In addition, it is also believed that since Li in the crystal structure is excessively pulled out during initial charge, the crystal structure is unstabilized as compared to that of Example 1, and the amount of Li to be inserted during discharge is decreased.

In addition, as shown in Table 1, the initial energy density of the battery of Example 13 is lower than that of the battery of Example 1.

The reason for this is believed as follows. In Example 13, since the Li/Mn ratio is 0.5, Mn is regularly-arrayed due to Li deficiency, and the percolation path of Li ions cannot be sufficiently secured, so that the Li ion diffusivity is decreased.

In addition, as shown in Table 1, the initial energy density of the battery of Example 14 is lower than that of the battery of Example 1.

The reason for this is believed that in Example 14, because of anion defect of the initial structure, oxygen desorption during charge is advanced, and the crystal structure is unstabilized, so that the Li insertion efficiency during discharge is decreased.

In addition, as shown in Table 1, the initial energy density of the battery of Example 15 is lower than that of the battery of Example 1.

The reason for this is believed that in Example 15, since the ratio Li/Mn is 2, the oxidation-reduction reaction of a transition metal to be used is suppressed, and the oxidation-reduction reaction of oxygen is more utilized. In addition, it is also believed that since Li in the crystal structure is excessively pulled out during initial charge, the crystal structure is unstabilized, and the amount of Li to be inserted during discharge is decreased.

From the results of Examples described above, it was found that in the composition formula of $Li_xMe_yO_\alpha X_\beta$, when $1.5 \leq x/y \leq 2.0$, $9 \leq \alpha/\beta \leq 66$, and $0.75 \leq (x+y)/(\alpha+\beta) \leq 1.15$ are satisfied, the initial energy density of the battery can be further increased.

Even if an element other than Mn is used as the Me of the composition formula of $Li_xMe_yO_\alpha X_\beta$, and/or an element other than Cl is partially used as the X, it is estimated that effects similar to those of the results described above may also be obtained.

The positive electrode active material according to the present disclosure may be used as a positive electrode active material of a battery such as a secondary battery.

What is claimed is:

1. A positive electrode active material comprising a compound represented by a composition formula: $Li_xMn_{y1}Me'_{y2}O_\alpha X_\beta$, wherein:
   the Me' represents one or more elements selected from the group consisting of Ni and Co
   the X represents one element selected from the group consisting of Cl,
   $0.5 \leq x \leq 1.5$, $0.5 \leq y1$, $y1+y2=y$, $0.5 \leq y \leq 1.0$, $1 \leq \alpha < 2$, and $0 < \beta \leq 1$, are satisfied, and respectively,
   a crystal structure of the compound belongs to space group Fm-3m in an initial state.

2. The positive electrode active material according to claim 1,
   wherein the compound is a primary component.

3. The positive electrode active material according to claim 1,
   wherein $1.5 \leq x/y \leq 2.0$ is satisfied.

4. The positive electrode active material according to claim 1,
   wherein $1.8 \leq \alpha \leq 1.97$ is satisfied.

5. The positive electrode active material according to claim 1,
   wherein $0.03 \leq \beta \leq 0.2$ is satisfied.

6. The positive electrode active material according to claim 1,
   wherein $2 \leq \alpha/\beta \leq 100$ is satisfied.

7. The positive electrode active material according to claim 6,
   wherein $9 \leq \alpha/\beta \leq 66$ is satisfied.

8. The positive electrode active material according to claim 1,
   wherein $0.75 \leq (x+y)/(\alpha+\beta) \leq 1.15$ is satisfied.

9. A battery comprising:
   a positive electrode containing a positive electrode active material;
   a negative electrode; and
   an electrolyte,
   wherein the positive electrode active material contains a compound which has a crystal structure belonging to space group Fm-3m in an initial state and which is represented by a composition formula: $Li_xMn_{y1}Me'_{y2}O_\alpha X_\beta$, where:
   the Me' represents one or more elements selected from the group consisting of Ni and Co;
   the X represents one element selected from the group consisting of Cl; and
   $0.5 \leq x \leq 1.5$, $0.5 \leq y1$, $y1+y2=y$, $0.5 \leq y \leq 1.0$, $1 \leq \alpha < 2$, and $0 < \beta \leq 1$, are satisfied.

10. The battery according to claim 9,
    wherein the negative electrode contains a negative electrode active material which stores and releases lithium, and
    the electrolyte is a non-aqueous electrolyte.

11. The battery according to claim 9,
    wherein the negative electrode contains a negative electrode active material which stores and releases lithium, and
    the electrolyte is a solid electrolyte.

12. The positive electrode active material according to claim 1,
    wherein the Me' is Ni.

13. The positive electrode active material according to claim 1,
    wherein the Me' is Co.

* * * * *